H. C. E. JACOBY.
DYNAMO ELECTRIC MACHINE.
APPLICATION FILED APR. 19, 1918.

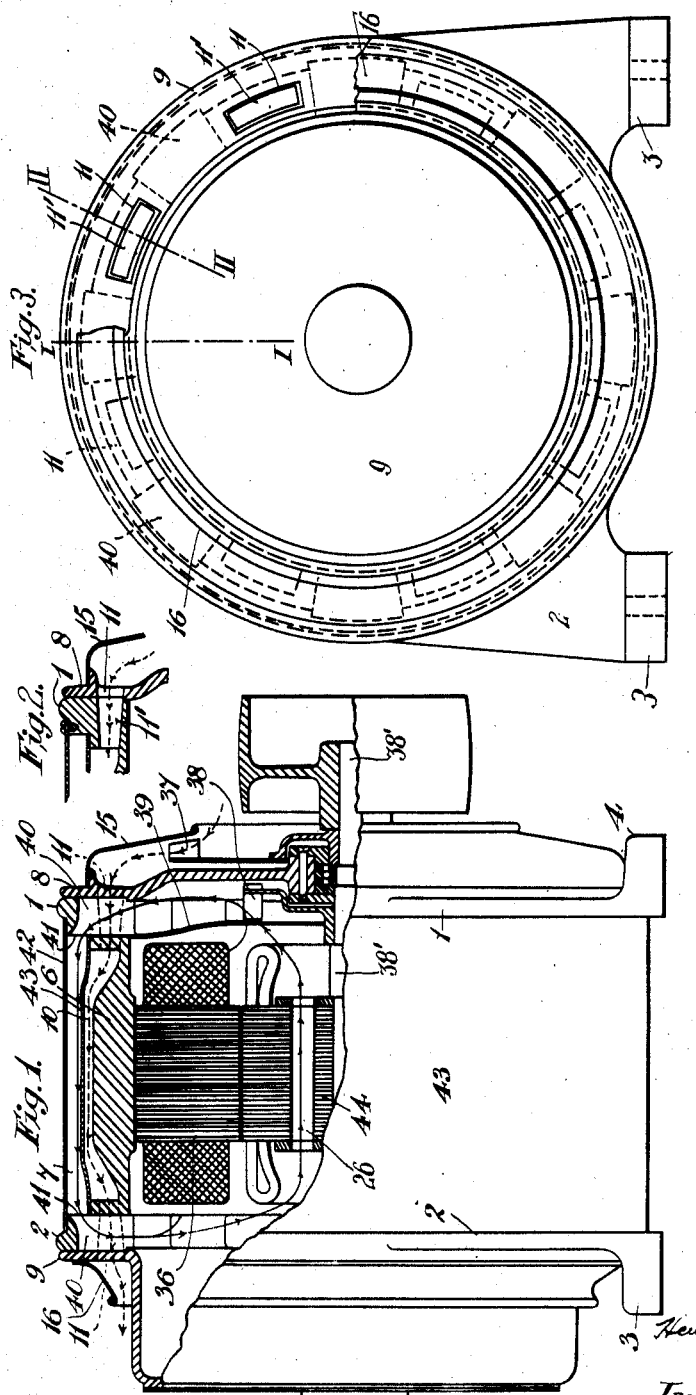

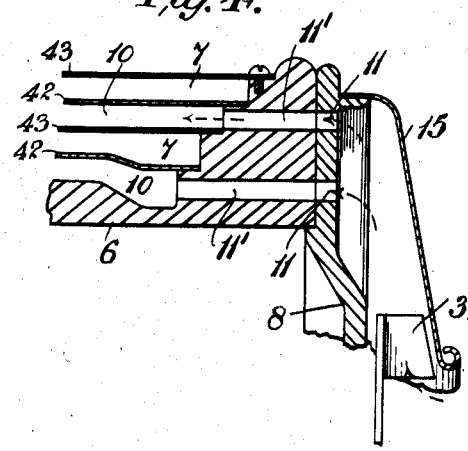
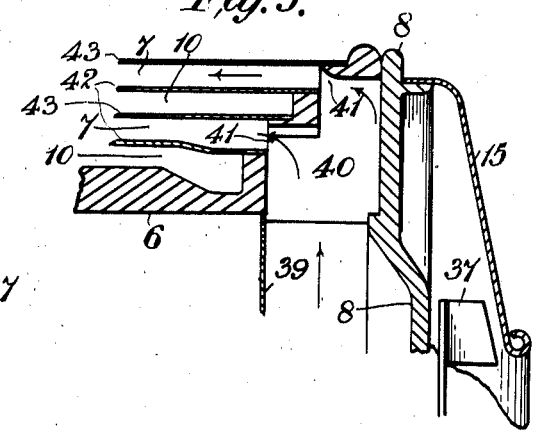
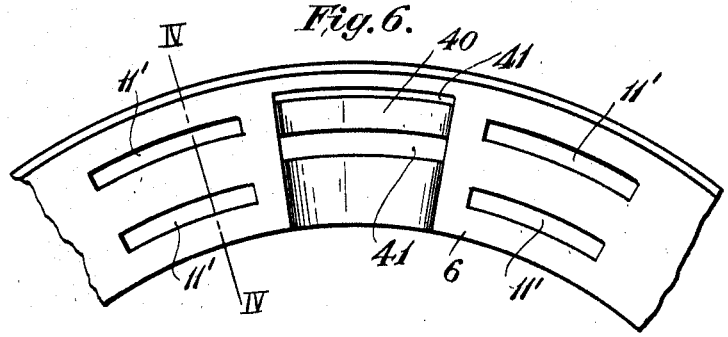
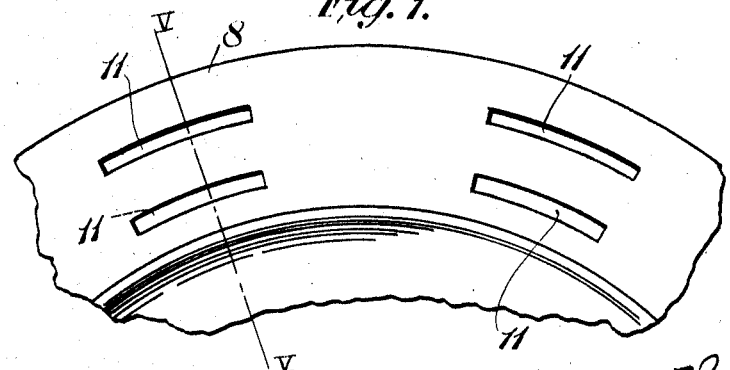

1,386,934.

Patented Aug. 9, 1921.
3 SHEETS—SHEET 3.

Inventor
Henry C. E. Jacoby
by
Kenyon & Kenyon
his Attorneys

UNITED STATES PATENT OFFICE.

HENRY CHARLES EDWARD JACOBY, OF LONDON, ENGLAND.

DYNAMO-ELECTRIC MACHINE.

1,386,934.  Specification of Letters Patent.  Patented Aug. 9, 1921.

Application filed April 19, 1918. Serial No. 229,498.

*To all whom it may concern:*

Be it known that I, HENRY CHARLES EDWARD JACOBY, a subject of the King of Great Britain, residing at London, England, have invented certain new and useful Improvements in Dynamo-Electric Machines, of which the following is a specification.

This invention relates to improvements in means for cooling dynamo electric machines, for example motors of the totally inclosed type.

In a co-pending application of Paul A. H. Mossay, Serial No. 214,441, filed Jan. 30th, 1918, it is proposed to circulate the hot internal air of the machine through channels beyond the field periphery in contact with the metallic walls of other channels through which cold fluid, such as air from the surrounding atmosphere, is forced, for the purpose of obtaining an increased cooling surface without unduly increasing the dimensions of the machine so that the output is increased per unit of area and a saving is effected in material and labor in the manufacture of the machine.

According to the present invention the machine is surrounded by two or more rings of metal or other heat-conducting-material the rings being spaced apart to form annular chambers which are connected to the interior of the machine and to a supply of cold fluid, such as cold air, so as to permit of the hot air from the interior of the machine being sandwiched between one or more layers or annuli of cold fluid. It will be understood that the term annular is intended to include chambers which conform to or substantially surround the machine whether it be of circular cross section as most commonly adopted for dynamo electric machines, or of angular cross section.

In the accompanying drawings;—

Figure 1 is a side elevation of a totally inclosed direct current motor partly in section on the line I—I Fig. 3.

Fig. 2 is a detail section on line II—II Fig. 3.

Fig. 3 is an end elevation, part of the end cover being broken away to expose the inlet openings for cold air.

Figs. 4 and 5 are side sectional elevations of a modified form of casing and portions of end shields applied thereto the sections being taken on lines IV—IV and V—V Figs. 6 and 7.

Figs. 6 and 7 are end elevations respectively of the portions of casing and end shield separated and as seen on their adjacent faces.

Figure 8:
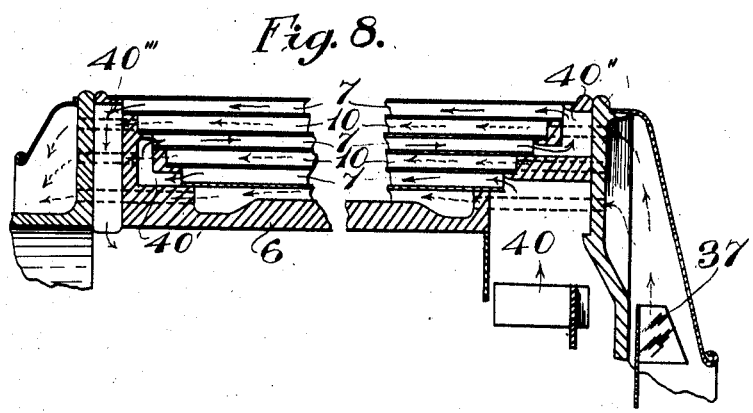
Figs. 8 and 9 are partial side sectional elevations illustrating further forms of the invention.

In the embodiment of the invention in a totally inclosed direct current motor as shown in Figs. 1 to 3, the motor comprises two end frames 1 and 2, provided with feet 3 and 4 and a casing 6 of magnetic material forming the yoke or magnet ring, the end frames and the yoke being conveniently cast together. The yoke is surrounded by two sheet metal rings 42, 43, spaced apart to form annular channels 7 and 10 for the hot internal air of the motor and cold external air respectively. The end frames 1 and 2 each have recesses 40 communicating with the interior of the machine and also with the hot air channel 7, the latter communication being effected by openings 41. The end frames 1 and 2 also each have openings 11' forming ducts between holes 11 in end shields 8 and 9 and the cold air channel 10.

The motor has a stator comprising the yoke 6 and the pole pieces 36 and a rotor or armature 44 of any suitable form well known in the art so that no further description need be given here. The armature preferably has air passages 26. A fan 38 of any suitable form is mounted on the armature shaft 38' for inducing a circulation of the internal air, the course of which is indicated by the arrows in full lines in Fig. 1, a baffle 39 being provided to assist the fan by directing the flow of air. A fan 37 of any suitable form is also mounted on the armature shaft outside the end shield 8, but within a cover 15, for the purpose of propelling cold air through the openings 11 in the shield 8, the openings 11' in the end frame 1, the cold air channel 10, and thence out through the openings 11' in the end frame 2 and openings 11 in the end shield 9. A cover 16 is provided on the end shield 9. The course of the cold air is indicated by the dotted arrows in Fig. 1. The annular cold air channels 10 are sandwiched between the heated yoke or magnet ring 6 and the hot air channel 7, whereas the hot air channel 7 is adjacent to the cool surrounding atmosphere, being separated therefrom merely by the conductive metal partition 43. The internal hot air can thus give up its heat to the atmosphere as well as to the cold air in the channel 10, which cold air makes direct contact with the yoke or magnet ring 6 and carries away heat therefrom. In a modified form the hot internal air and the cold air may be split into a plurality of layers or strata for example as indicated by Figs. 4 and 5, in which form there are two hot air channels 7, two cold air channels 10 and two sets of openings 11, 11', and 41, the arrangement being otherwise similar to that hereinbefore described. The cold air and hot air may be circulated through their respective channels in the same or opposite directions the direction of flow, depending, as is well known in the art, on the inclination of the fan blades in relation to the direction of rotation.

The term dynamo electric machine is used in the general sense adopted in the art to include generators, motors, motor generators, or motor converters, or like electrical machines.

Figure 9:
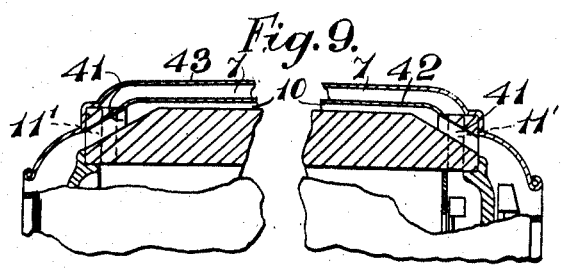

In Fig. 9 a magnet ring 6 devoid of flanges is provided with inclined ducts 41 for external air alternating with radial ducts 11' for internal air. The sheet metal rings 42, 43, are slightly curved to form the channels 10 and 7.

In Fig. 8 the end rings 1 and 2 are each provided with separate series of ducts enabling the hot internal air to be passed in series through a plurality of annular channels 7, the cold air passing in parallel through a plurality of annular channels 10. These ducts are indicated 40, 40', 40'' and 40''', and the internal air passes through these ducts in the order above given in series with the respective channels 7 connecting them. By this means the path of the internal air and the time it is being subjected to the cooling action of the cold air are prolonged, whereas the cold air passing through in parallel passes away comparatively quickly so that the heat absorbed by it is rapidly removed from the vicinity of the magnet ring.

I claim:—

1. An inclosed dynamo electric machine having a casing comprising a yoke, a plurality of sheet metal rings surrounding said yoke, said rings being spaced from said yoke and from each other to form separate series of annular channels for cooling fluid and for the internal hot air of the machine, means for circulating the hot internal air through one series of channels and means for passing cooling fluid through the other series of channels, substantially as and for the purpose hereinbefore set forth.

2. An inclosed dynamo electric machine having a casing comprising a yoke, end frames and end shields, sheet metal rings surrounding said yoke, said rings being spaced apart to form annular channels for the hot internal air of the machine and for cooling fluid, said end frames having ducts therein communicating with the interior of the machine and with the annular channel for hot internal air, and said end shields having ducts communicating with the exterior of the machine and the annular channel for the cooling fluid.

3. An inclosed dynamo electric machine comprising a stator having a magnet yoke, a rotor, sheet metal rings surrounding said yoke, and spaced therefrom and from each other to form channels for the hot internal air of the machine and for cold external air respectively, said stator having ducts communicating with the hot air channel and the interior of the machine, and other ducts communicating with the cold air channel and the exterior of the machine, and two fans one inside the machine and one outside the machine, for inducing circulation of the hot internal air and external cold air through the respective hot and cold air ducts and channels, substantially as hereinbefore set forth.

4. An inclosed dynamo-electric machine having a casing comprising a cylindrical magnetic element, a plurality of sheet metal members about said element, said members being spaced from said element and from each other to form separate series of circumferential channels for cooling fluid and for the internal hot air of the machine, means for circulating the hot internal air through one series of channels and means for passing cooling fluid through the other series of channels, substantially as and for the purpose set forth.

5. An inclosed dynamo-electric machine comprising a stator having a cylindrical magnetic element, a rotor, sheet metal members about said element, and spaced therefrom and from each other to form separate series of channels, one series of interior channels for cold air and another series of exterior channels for the hot internal air of the machine, said stator having a set of ducts connecting the exterior hot air channels with the interior of the machine, and another set of ducts connecting the interior series of channels with the exterior of the machine, and two fans, one inside the machine and one outside the machine, the former for inducing circulation of the hot internal air from the interior of the machine through the exterior series of channels, and the other for inducing circulation of external cold air through the interior series of channels, substantially as set forth.

6. An inclosed dynamo-electric machine having a casing, a plurality of sheet metal members about said casing, said members being spaced from said casing and from each other to form separate series of circumferential channels, an interior series for cooling fluid and an exterior series for the hot internal air of the machine, means for circulating the hot internal air through the outer series of channels, and means for passing the cooling fluid through the interior series of channels, substantially as and for the purpose set forth.

In testimony whereof I have signed my name to this specification in the presence of two subscribing witnesses.

HENRY CHARLES EDWARD JACOBY.

Witnesses:
A. W. MATHYS,
G. I. BRIDGES.